April 22, 1924.

S. H. CAMPBELL

HAND BRAKE MECHANISM

Filed Sept. 4, 1923

1,491,378

INVENTOR
S. H. CAMPBELL
BY E. E. Huffman
ATTORNEY

Patented Apr. 22, 1924.

1,491,378

UNITED STATES PATENT OFFICE.

STERLING H. CAMPBELL, OF ST. LOUIS, MISSOURI, ASSIGNOR TO RAILWAY DEVICES COMPANY, OF ST. LOUIS, MISSOURI, A CORPORATION OF MISSOURI.

HAND BRAKE MECHANISM.

Application filed September 4, 1923. Serial No. 660,911.

*To all whom it may concern:*

Be it known that I, STERLING H. CAMPBELL, a citizen of United States of America, residing at 705 Olive St., St. Louis, State of Missouri, United States of America, have invented a certain new and useful Hand Brake Mechanism, of which the following is such a full, clear, and exact description as will enable anyone skilled in the art to which it appertains to make and use the same, reference being had to the accompanying drawings, forming part of this specification.

My invention relates to a hand-brake mechanism and particularly to that form of mechanism in which the brake shaft is connected to the operating handle by means of a ratchet mechanism including a dog controlled by the said handle.

The object of my invention is to provide means for locking the dog in engagement with its ratchet wheel so that the device may be used to rotate the brake staff in the reverse direction from that in which its brake is applied so as to insure the return of the brake mechanism to normal position.

Figure 2:
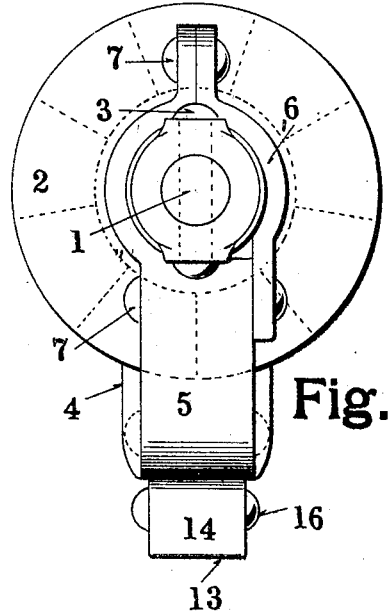
Figure 1:
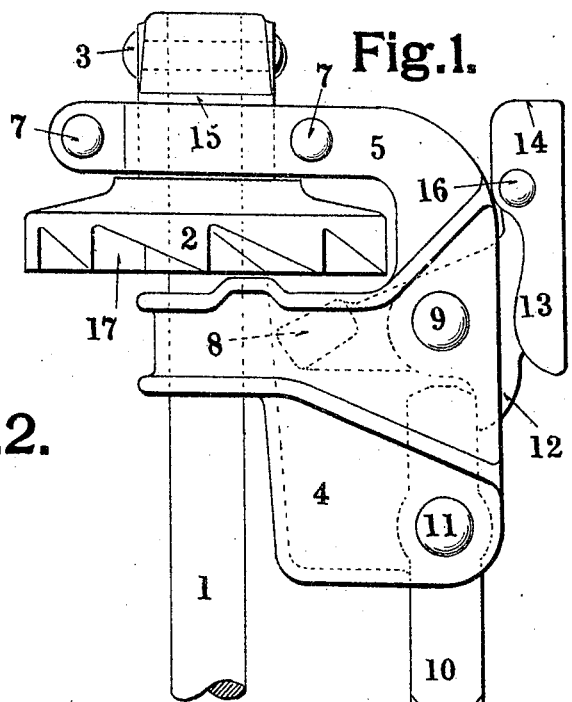
Figure 3:
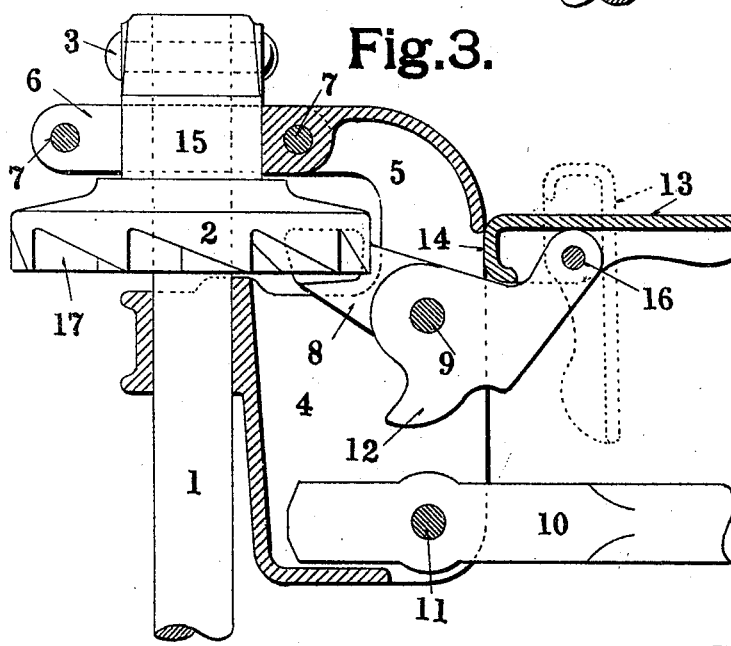

In the accompanying drawings which illustrates one form of brake mechanism made in accordance with my invention Figure 1 is a side elevation, Figure 2 is a top plan view and Figure 3 is a vertical section.

The numeral 1 indicates a portion of a brake staff to which my device is applied. A ratchet wheel 2 is secured to the staff 1 by a bolt or rivet 3 passing through said staff and the upper portion of the hub 15 of the ratchet wheel. The housing 4, which forms a bearing for the brake staff below the wheel, is provided with a yoke 5 forming a bearing for the hub 15. One side 6 of the yoke is made separate from the body of the yoke so that the wheel may be placed in position. This side 6 is secured in place by bolts or rivets 7.

A dog 8 adapted to engage with the teeth 17 of the ratchet wheel is pivotally mounted in the housing 4 upon a bolt or rivet 9. The operating handle 10 is also pivotally mounted in the housing upon a bolt or rivet 11. The inner end of the handle 10 is adapted to strike against a finger 12 on the dog 8 when the handle is in vertical position and thus hold the dog out of engagement with the wheel.

The outer end of the dog 8 projects beyond the housing 4 and has a detent 13 pivoted to it by means of a bolt or rivet 16. The upper face 14 if the detent 13 is so positioned with relation to the pivot 16 that when the dog is in engagement with the ratchet wheel the said face 14 may be brought into contact with the vertical edge of the housing 4, as shown in Figure 3, by moving the detent 13 from normal position, shown in dotted lines in this figure, into the position shown in full lines. When in this position the detent locks the dog in engagement with the ratchet wheel so that the brake staff may be rotated in reverse direction to release the brake. This movement may be imparted to the staff either by the operating handle 10 or by the detent 13 which is so shaped as itself to form a handle for moving the housing 4.

Having fully described my invention what I claim as new and desire to secure by Letters Patent of the United States is:

1. In a device of the class described, the combination with a brake staff, of a ratchet wheel carried thereby, a dog for said wheel, an operating handle, and means for locking said dog in engagement with said wheel.

2. In a device of the class described the combination with a brake staff, of a ratchet wheel carried thereby, an oscillating member mounted on said staff, a dog for said wheel carried by said member, a handle for actuating said member and for controlling the engagement of the dog with the wheel, and means for locking said dog in engagement with said wheel.

3. In a device of the class described, the combination with a brake staff, of a ratchet wheel carried thereby, an oscillating member carried by said staff, a dog pivotally carried by said member, a pivoted operating handle carried by said member and adapted to hold said dog out of engagement with said wheel when in vertical position, and a detent carried by said dog for locking the latter in engagement with said wheel.

4. In a device of this class described, the combination with a brake staff, of a ratchet wheel carried thereby, an oscillating member carried by said staff, a dog pivotally carried by said member, an operating handle pivoted to said member and adapted to hold said dog out of engagement with the wheel when in vertical position, and a detent pivoted to said dog for locking the latter in engagement with said wheel, said detent forming a handle for rotating the staff to release the brake.

In testimony whereof, I have hereunto set my hand and affixed my seal.

STERLING H. CAMPBELL. [L. S.]